Dec. 23, 1969     C. VINCENT     3,485,186

CONSTRUCTION OF ROLLERS FOR PELLET MILLS

Filed Sept. 26, 1966     4 Sheets-Sheet 1

INVENTOR.
CHARLY VINCENT

BY

Michael S. Striker
ATTORNEY

INVENTOR.
CHARLY VINCENT

Dec. 23, 1969   C. VINCENT   3,485,186
CONSTRUCTION OF ROLLERS FOR PELLET MILLS
Filed Sept. 26, 1966   4 Sheets-Sheet 4

INVENTOR.
CHARLY VINCENT
BY
Michael S. Striker
ATTORNEY

United States Patent Office 3,485,186
Patented Dec. 23, 1969

3,485,186
CONSTRUCTION OF ROLLERS FOR
PELLET MILLS
Charly Vincent, Colle de Leon XIII, 28 (5°) C,
Zaragoza, Spain
Filed Sept. 26, 1966, Ser. No. 582,107
Claims priority, application Spain, Sept. 27, 1965,
317,864
Int. Cl. A21c 11/16
U.S. Cl. 107—14                                6 Claims

ABSTRACT OF THE DISCLOSURE

A roller for a pellet mill cooperating with a die to extrude powdery or pasty material through rows of bores in said die during rolling of the roller over the die surface, in which the roller is formed on its peripheral surface with grooves extending transverse to a plane of symmetry of the roller normal to the roller axis and in which the depth of each groove decreases from the plane of symmetry towards the side faces of the roller to thereby equalize the extrusion of material through the bores in the die.

---

The present patent of invention refers to improvements in the construction of rollers for pellet mills, by means of which improvements it is possible to solve one of the most difficult of all problems concerning pellet mills, which has always been to have all the holes of the die producing the same quantity of pellets.

In the classic case of a rotating annular die provided with a plurality of rows of holes, the outer rows always produce less than the central ones.

All the mechanical arrangements used to remedy this defect do not really give satisfactory results; the most common of these is to place the holes in a track-shaped slot where the rollers turn, or shorten the length of the holes in the outer rows by making counter-bores of a greater diameter than that of the hole, to a specified depth, in order to facilitate the extrusion of the pelleted flour for instance ground live stock feed through those rows.

In this latter case the exit velocity of the pellets from the outer and central rows can be made uniform, although at the price of obtaining pellets from the outer rows which are less compressed than those leaving the central rows, which have full length without counter-bores. In addition, it is difficult to achieve control, and there are pellets which are longer than others because the cutting knife is the same for all the rows.

The production failure of the outer rows is due to the flour's facility for escaping from the action of the roller between the edge of the roller and that of the die.

This leads to a lack of sufficient pressure in these outer rows, which lack slows down the passage of the matter in the holes of the outer rows.

The consequences of this easily understood phenomenon are as follows:

The central rows of holes from which the flour has no time to escape produce much more than the lateral rows; they work at higher pressure because they are supercharged, and wear out sooner because the walls situated between the holes are subjected to greater abrasion from the larger volume of matter and higher pressure;

The accelerated wear on the central rows decreases and in turn the resistance these rows initially offered to the passage of the flour, further increasing the flow from these rows, so that the center of the die presents an increasingly deeper track which terminates the effective service of the die prematurely;

The poorly fed outer rows are covered over little by little and thus eventually lose their productivity, despite the fact they are the same as new; and The rollers, subjected to greater stress at their centers than at their sides, also wear more at the center and thereby become out of level with respect to the die, but in a contrary direction, that is, the clearance between die and rollers does not remain uniform.

The improvements claimed here have practically solved this ancient problem by applying a variable depth to the slots or grooves made in the roller surfaces, the depth being greater in the center of the roller and shallower in the outer portions thereof, thereby facilitating the movement of the meal from the center of the roller to its outer parts but cutting off all exit by means of a reduction in slot area at their exits.

It is impossible to close off the slot exits entirely, for in such case the floury paste, i.e. moist ground material, dams up where the slots are blocked off at their ends. And if the paste cannot circulate and renew itself in the slots, it hardens to such an extent that the roller becomes a smooth cylinder which does not catch or hold the material but commences to slip, and the output of the machine decreases in an inadmissible manner, the paste in the slots hardening to the point where it can be removed only with a hammer and chisel.

Although in this simple form a notable improvement is already achieved, a variation of the invention also provides for modification of the shape of the slots to promote even further the phenomenon of discharge from the center of the die, in behalf of the outer rows of holes.

For this a second more perfect manner of realizing the invention provides curve-shaped slots in which the paste, compressed in the center of the slot where, when the slot revolves, it enters first into contact with the die, is invited by the angle of curve of the slot to move toward the latter's extreme ends; the effect is somewhat similar to a plow opening a furrow in the earth, the rotation of the roller itself helping the paste to move outward.

But as the flour approaches the outer zone where the slot area decreases it is not permitted to escape freely even in pulverulent form, but is compressed and checked thus maintaining great pressure, which pressure in turn exerts strong pressure toward the entrance into the outer rows of the die, with the result that these rows become as active as the center rows.

Tests carried out fully confirm this theory, and it has been proven that with the system described the production of all the rows of holes is practically equal, as confirmed by the now completely uniform wear over the whole width of the die and rollers. The consequences are that the rollers and the dies will last much longer and a higher yield by the machine.

The dies which have not been used for some days because the mill has been worked with others of different calibre are again immediately ready for use, without the necessity of opening up the outer rows which otherwise would not draw for lack of pressure if not opened, thus saving a great loss of time. Consequently all these features are tremendous advantages in favor of the new system.

However, the economical and industrial production of rollers provided with these special slots, which at the same time are curved and progressively diminishing in depth, has been a rather difficult problem to solve, but which finally has been achieved in the manner disclosed.

A bell-shaped milling tool, the axis of which is displaced in relation to the center of the roller, attacks the surface of the latter; because the curvature of the roller separates its curved surface from the rotation plane of the teeth of the belled milling tool, a slot is geometrically obtained which is deep in the center of the roller and less deep where the teeth leave and enter the curved roller.

With this shape and for certain particularly compressible products to be pelleted it is possible to even close off the exit, as such does not hamper circulation of the paste because the contact with the die varies from the center to the extremities.

By changing the milling tool, an infinite relationship of depths between the center of the slot and its exit can be obtained.

Once a slot is made, the milling machine table is lowered, the divisor is rotated to make the roller turn the span of a tooth, and by raising the table little by little the next slot and those successively following are cut.

This succession of operations is carried out economically with a modern milling machine equipped with automatic cycle control apparatus; one miller alone can watch various milling machines all at once.

Practice has proved the belled milling tool to be troublesome, for it is expensive and if a tooth breaks the tool is lost.

Therefore it is advantageously replaced by a circular plate having various interchangeable knives which are sharpened separately and individually with the help of a template, and once re-sharpened are reinserted in their respective seats in the plate.

This means of carrying out the invention is interesting in the case of very wide dies where the central curvature of the slot is only slightly pronounced due to the width of the roller, but in the majority of cases the simple curved shape described is perfectly sufficient, and is cheaper to produce in the workshop with the previously cited equipment.

Summarizing, the characteristics of the improved rollers as claimed are:

Rather than being constant, the depth of the slots or grooves separating the teeth of the rollers is variable;

The maximum depth of the slot lies in the central area and the minimum in the lateral exists;

The slots separating the teeth need not be straight but can be semi-circular, or of half-moon shape;

The slots separating the teeth may form a V, the apex of which lies in the central zone of the roller;

The slots may be constituted by two oppositely inclined helical slots having a depth decreasing from the central zone of the roller toward the outer edges of the cylindrical surface of the roller; and The slots may be formed in rollers by means of a rotary tool whose teeth, in their circular trajectory on a plane, intersect the curved surface of the roller so that they form one of the curved and variable-depth slots during rotation of the tool about an axis substantially normal to and laterally displaced from the roller axis.

In the accompanying drawings:

FIG. 1, a diagram of a partially cross-sectioned elevation, showing rollers having straight parallel slots of constant depth.

Figure 7:
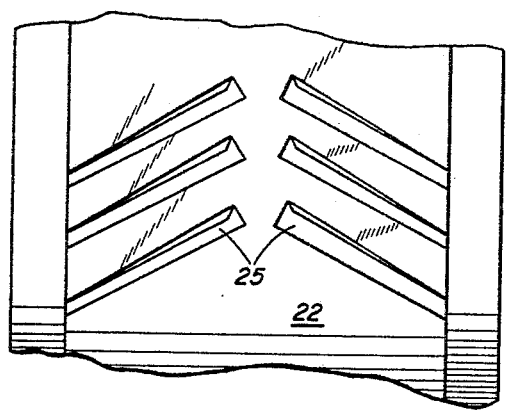

FIG. 7 indicates, in a manner analogous to the previous cases, the modified inclined arrangements of the slots in the roller.

Figure 8:
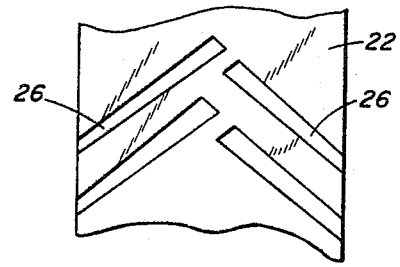
Figure 9:
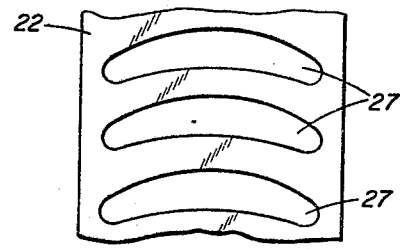

FIGS. 8 and 9 illustrate additional variations in the arrangement of the slots.

FIGS. 10 and 11 diagram the behavior of the pastes in the slots as referred to in FIG. 9, in accordance with what is later indicated.

The following is a description of said figures and the numbers appearing on them to designate the parts and details of the rollers represented therein as of interest to the purposes of this specification.

Figure 1:
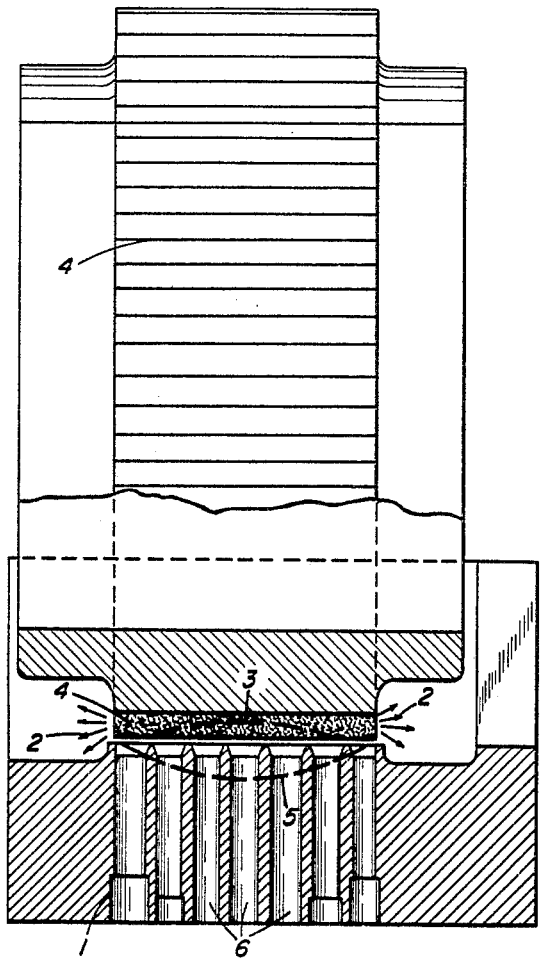
Figure 2:
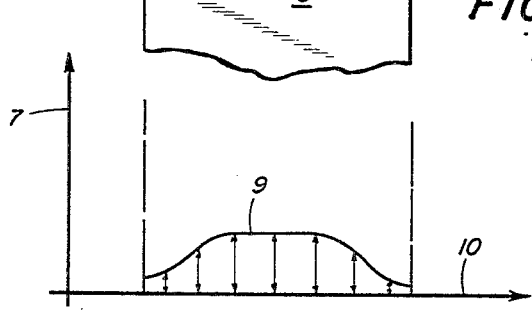
FIG. 2 is a pressure diagram for the above case.

In the first case considered (FIGS. 1 to 3), the straight parallel slots or grooves 4 of constant depth in the classic roller permit a strong escape of paste as indicated by 2, with 3 showing abrasion of the roller and 5 the shape given to the die by abrasion, whose holes 6 have the shortening in the useful area marked by 1. The knife is indicated by 8.

In the pressure diagram, the ordinates 7 show the pressure values, the abscissas 10 correspond to die widths, and the curve 9 indicates the variaton of such pressures.

Figure 3:
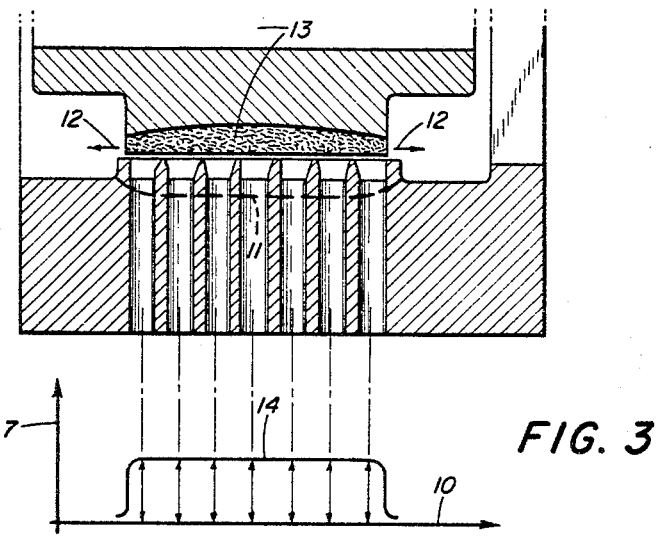
FIG. 3 illustrates the new arrangement of straight slots having reduced depth at their ends, and the corresponding pressure diagram is shown beneath this figure.

When the depth of the straight slots or grooves is reduced toward the outer ends as indicated by 13 in FIG. 3, the escape of the paste at 12 is controlled, the abrasion of the die is marked at 11, and the pressure curve 14 refers to the ordinates 7 and abscissas 10 in a manner analogous to the previous case.

Figure 4:
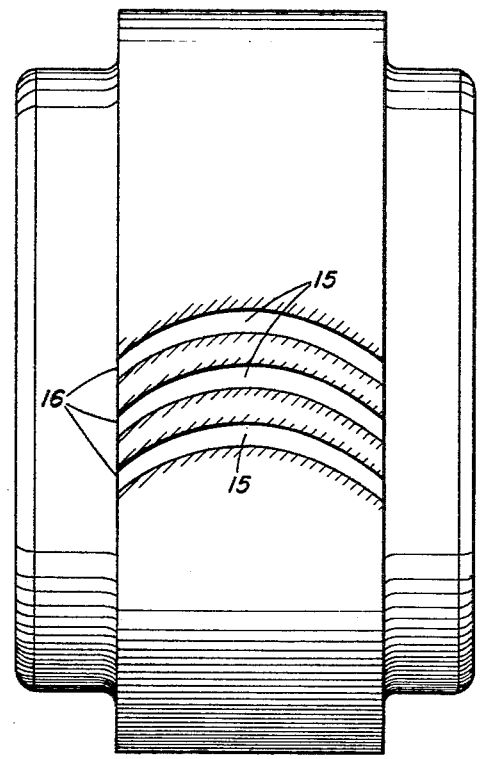
FIG. 4 illustrates the new arrangement of curved slots.
Figure 5:
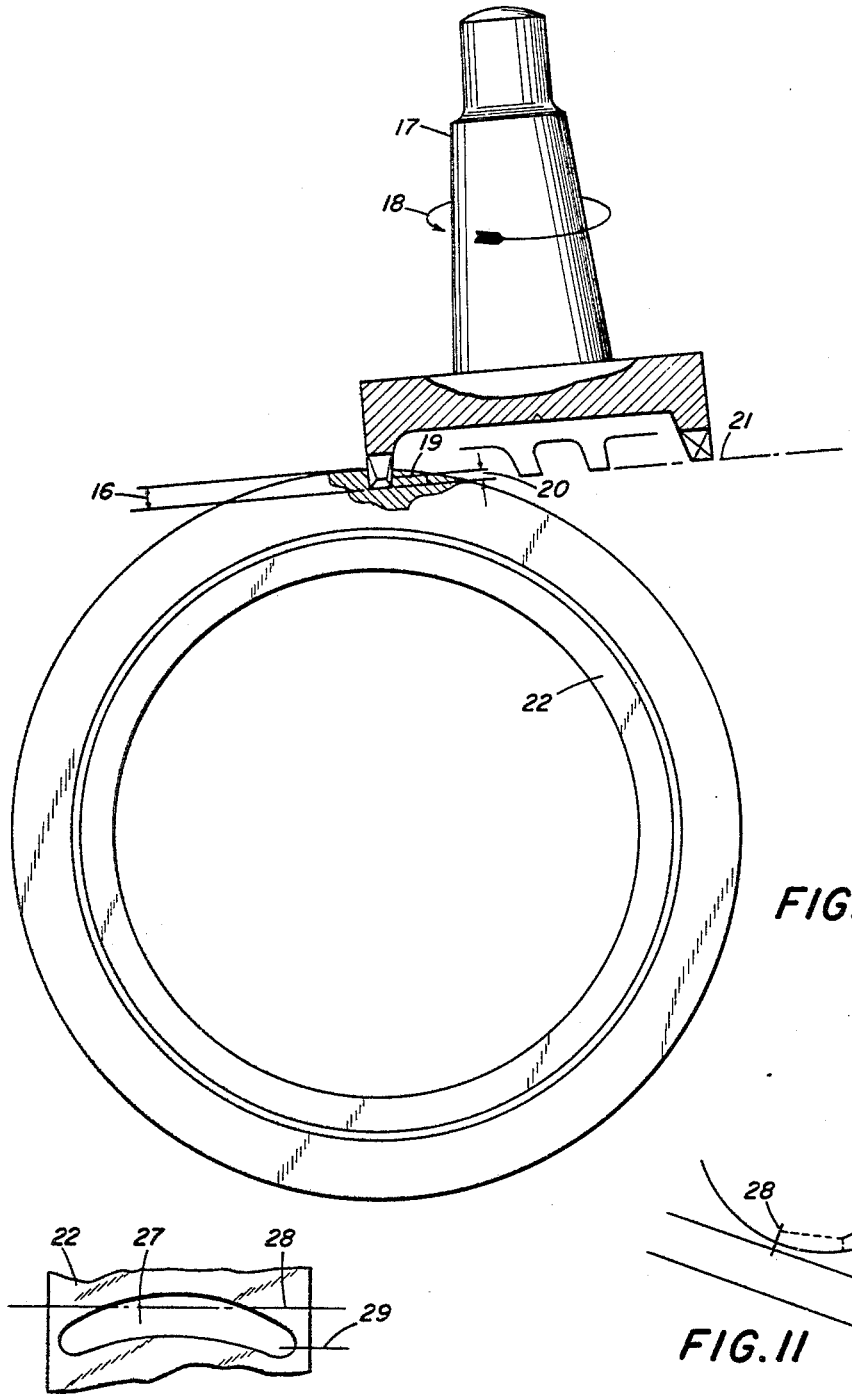
FIG. 5 shows how the tool slots a roller.
Figure 6:
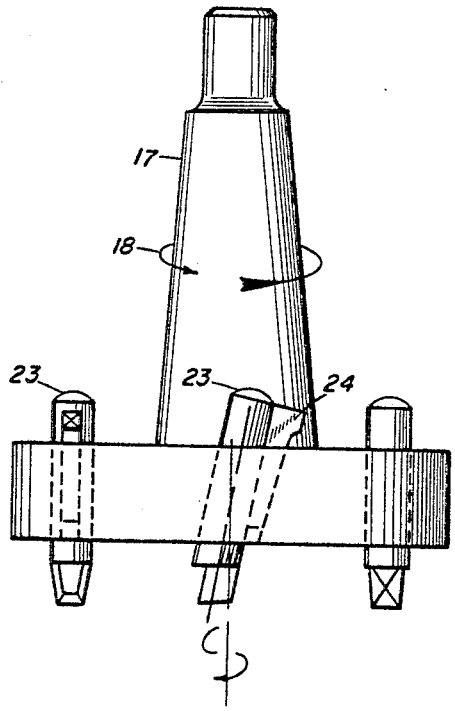
FIG. 6 shows the mounting of the tools in the tool-holding device.

In the modified form of roller having curved slots 15 (FIG. 4), their width at their central portion is greater than at the ends 16, and in the other variations referred to previously, in which the roller 22 has slots of the shapes indicated by 25 (FIG. 7), 26 (FIG. 8) and 27 (FIG. 9), and it is to be understood that the depths of these slots is also greater at a central portion of the roller than adjacent to the end faces thereo.

The slots 25 and 26 repsectively shown in FIGS. 7 and 8 respectively extend from opposite side faces of the roller inclined in opposite directions to each other and ending in the region of the central plane of symmetry of the roller, and the slots 25 of FIG. 7 are in the form of oppositely inclined helix portions.

With reference to the slot shape 27, it is interesting to note that in the case of elastic products the value of the depth of the slot at its exit can be nil, which does not prevent circulation of the paste in the slot because when the material at the center of the slot is squeezed by the die, its extremities are still not compressed due to their inclination, the pressure thereby being transferred from the center of the curved or inclined slot so that as the roller rotates upon the die the pressure acts on the paste and causes it to circulate in the slot until its exit is closed off.

Thus (FIGS. 10 and 11) when the roller rests on the generatrix 28 the slot does not yet do so at 29, and the paste can circulate and escape by that end, thereby renewing it little by little without allowing it to harden even though the slot is closed at its ends.

The present patent of invention comprises the following claims:

1. A roller for a pellet mill arranged for rolling over a die formed with rows of bores therethrough, said roller having a pair of opposite end faces and between said end faces an outer cylindrical surface and being formed with grooves extending transverse to a plane of symmetry normal to the roller axis from the cylindrical surface thereof into the roller and having each a depth gradually decreasing from the region of said plane of symmetry toward said opposite end faces of the roller.

2. A roller as defined in claim 1, wherein each of said grooves extends from one to the other of said opposite end faces of said roller.

3. A roller as defined in claim 1, wherein the width of each of said grooves decreases from the region of said plane of symmetry towards the respective end face.

4. A roller as defined in claim 1, wherein each of said grooves has a pair of curved side faces.

5. A roller as defined in claim 1, wherein said grooves are inclined to the axis of rotation of said roller.

6. A roller as defined in claim 1, wherein each of said grooves ends short of said plane of symmetry, and wherein said grooves are arranged in two rows respectively to opposite sides of said plane of symmetry and wherein the grooves on said opposite sides of said plane are respectively oppositely inclined to said plane.

References Cited

UNITED STATES PATENTS

| | | | |
|---|---|---|---|
| 1,467,883 | 9/1923 | Sizer | 107—14 |
| 3,129,458 | 4/1964 | Mitchell | 18—12 |
| 3,240,169 | 3/1966 | Cunningham | 107—14 |
| 2,875,709 | 3/1959 | Landers | 107—14 |

FOREIGN PATENTS

| | | |
|---|---|---|
| 562,186 | 8/1958 | Canada. |
| 685,806 | 1/1953 | Great Britain. |

WALTER A. SCHEEL, Primary Examiner

R. I. SMITH, Assistant Examiner

U.S. Cl. X.R.

18—12; 29—121